United States Patent
Hattori (10) Patent No.: US 12,464,262 B2
(45) Date of Patent: Nov. 4, 2025

(54) INFRARED IMAGING DEVICE AND FIXED PATTERN NOISE DATA GENERATION METHOD

(71) Applicant: Mitsubishi Electric Corporation, Tokyo (JP)

(72) Inventor: Masaharu Hattori, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 25 days.

(21) Appl. No.: 18/558,514

(22) PCT Filed: Jun. 18, 2021

(86) PCT No.: PCT/JP2021/023136
§ 371 (c)(1),
(2) Date: Nov. 1, 2023

(87) PCT Pub. No.: WO2022/264390
PCT Pub. Date: Dec. 22, 2022

(65) Prior Publication Data
US 2024/0244348 A1  Jul. 18, 2024

(51) Int. Cl.
*H04N 25/671* (2023.01)
*G01J 5/48* (2022.01)
(Continued)

(52) U.S. Cl.
CPC ............. *H04N 25/671* (2023.01); *G01J 5/48* (2013.01); *G01J 5/70* (2022.01); *H04N 23/20* (2023.01);
(Continued)

(58) Field of Classification Search
CPC .... H04N 25/671; H04N 25/21; H04N 25/673; H04N 23/20; G01J 5/70; G01J 5/48
See application file for complete search history.

(56) References Cited

U.S. PATENT DOCUMENTS

| 2014/0375808 A1 | 12/2014 | Kao et al. |
| 2015/0356745 A1 | 12/2015 | Bobbitt et al. |

(Continued)

FOREIGN PATENT DOCUMENTS

| JP | H10-142065 A | 5/1998 |
| JP | 6275334 B2 | 2/2018 |
| WO | 2016/185701 A1 | 11/2016 |

OTHER PUBLICATIONS

International Search Report issued in PCT/JP2021/023136; mailed Sep. 7, 2021.

(Continued)

*Primary Examiner* — Kathleen V Nguyen
(74) *Attorney, Agent, or Firm* — Studebaker Brackett PLLC (57) ABSTRACT

Provided here are: an infrared imaging element that receives infrared light to capture a thermal image; an element temperature sensor that detects a temperature of the infrared imaging element; an FPN memory that stores therein FPN data at each of the temperatures; a frame memory that saves a plurality of pieces of frame data composed of thermal images captured by the infrared imaging element in a fixed period of time; and an FPN data generation unit that, when an imaging target is determined not to have changed on the basis of the frame data, acquires from the FPN memory, the FPN data corresponding to the temperature of the infrared imaging element at which said frame data were obtained; and performs averaging processing between average values AF of the plurality of pieces of frame data and the thus-acquired FPN data, to thereby regenerate the FPN data in an updated manner.

9 Claims, 4 Drawing Sheets

(51) Int. Cl.
  *G01J 5/70*  (2022.01)
  *H04N 23/20*  (2023.01)
  *H04N 25/21*  (2023.01)
  *G01J 5/00*  (2022.01)

(52) U.S. Cl.
  CPC ...... *H04N 25/21* (2023.01); *G01J 2005/0074* (2013.01)

(56) References Cited

U.S. PATENT DOCUMENTS

2017/0163884 A1 6/2017 Kobayashi
2018/0098009 A1* 4/2018 Furuta ........................ G01J 1/42

OTHER PUBLICATIONS

An Office Action; issued by the Taiwan Intellectual Property Office on Jul. 12, 2022, which corresponds to Japanese Patent Application No. 111120421.
An Office Action mailed by the Korean Intellectual Property Office on Jun. 17, 2025, which corresponds to Korean Patent Application No. 10-2023-7042513 and is related to U.S. Appl. No. 18/558,514.

* cited by examiner

INFRARED IMAGING DEVICE AND FIXED PATTERN NOISE DATA GENERATION METHOD

TECHNICAL FIELD

The present application relates to an infrared imaging device and a method of generating fixed pattern noise data.

BACKGROUND ART

Heretofore, infrared imaging devices capable of capturing two-dimensional images have been utilized, for example, in the fields of monitoring cameras, night vision devices and thermography, or forward monitoring devices to be installed in vehicles, airplanes, etc., for professional use, industrial use, military use and the like. Meanwhile, in recent years, with the progress of price reduction of the infrared imaging devices, there are also scenes where the infrared imaging devices are utilized for consumer use, as exemplified by the case where such infrared imaging devices using SOI (Silicon On Insulator) diodes and capable of capturing two-dimensional images are installed in domestic air conditioners.

According to a thermal infrared imaging device, its imaging element is configured in such a manner that pixels each having a heat-insulated structure are arranged in a two-dimensional array, and an infrared image is captured by use of a phenomenon that the temperature of the pixel varies due to incident infrared light. Specifically, a current is injected into the pixel or a voltage is applied thereto, to thereby generate an electric signal. Due to incidence of infrared light, the temperature of the pixel is slightly changed and thus the electric signal is slightly changed. This change in the electric signal is amplified and then outputted after being converted into a digital signal.

Here, the temperature of the pixel does not depend solely on the temperature change caused by incident infrared light, but also depends on the temperature change caused by: self-heating of the pixel itself due to application of the current or voltage; heating of the components other than the imaging element; variation in the ambient temperature; and the like. It is further noted that the level of the self-heating differs due to pixel-to-pixel variations in heat-insulation property, power consumption amount, applied voltage, current amount, etc., so that an output-level difference occurs between the respective pixels. In addition, amplifier-to-amplifier variation or the like may cause an output-level difference. In terms of the imaging element as a whole, these output-level differences emerge as a noise of a fixed pattern, and are thus referred to as a fixed pattern noise (FPN: Fixed Pattern Noise). Since the fixed pattern noise varies due to heat-insulation property of each of the pixels, and the power consumption amount varies due to the ambient temperature, the output level may be changed significantly due to variation in the ambient temperature.

As described above, in the thermal image data captured by the infrared imaging device, the real image-captured data resulting from capturing energy emitted from an imaging object and the fixed pattern noise that is specific to the device, are mixed with each other. Thus, in order to obtain a proper thermal image, it is necessary to generate data of the fixed pattern noise, and then to remove the fixed pattern noise data from the captured thermal image data.

As methods for acquiring the fixed pattern noise data, there are known: a method of imaging such a scene that is created by covering the optical system with a shutter to thereby shut off infrared light coming from the outside; and a method of performing calibration in an out-of-focus state of the lens without closing the correction shutter, while directing the visual axis to something (for example, "sky" or the like) that is assumed to be relatively uniform in temperature.

On the other hand, in Patent Document 1, for example, such a method is disclosed that makes a correction without using a mechanical shutter at the time an actual image is to be corrected. This method is based on a characteristic of a pyroelectric sensor, namely, based on such a relation that a change in the infrared detection signal is dominantly due to shot noise so that the level of change in the infrared detection signal due to shot noise, is equal to ½ power of the amount of signal components.

CITATION LIST

Patent Document

Patent Document 1: International Patent Application Publication No. 2016/185701 (Paragraph 0054)

SUMMARY OF THE INVENTION

Problems to be Solved by the Invention

However, price reduction is important for consumer use. Thus, in order to reduce the price as much as possible, it is preferable to exclude from the optical system of the infrared imaging device, its mechanical shutter for acquiring the fixed pattern noise and further, it is preferable that the optical system has a fixed focus. In this case, a problem arises that it is not possible to employ: the method of imaging the scene that is created by covering the optical system with the mechanical shutter to thereby shut off infrared light coming from the outside; and the method of performing calibration in an out-of-focus state of the lens while directing the visual axis to something that is assumed to be relatively uniform in temperature.

Further, according to an SOI diode, such a relation is not shown that the level of change in the infrared detection signal due to shot noise is equal to ½ power of the amount of signal components. Thus, there is a problem that, if the imaging element of the infrared imaging device uses SOI diodes, it is practically not possible to apply the method disclosed in Patent Document 1.

This application has been made for solving the problems as described above, and an object thereof is to provide an infrared imaging device which can acquire, even when it is an infrared imaging device using SOI diodes, fixed pattern noise data without the need of the mechanical shutter, and a method of generating the fixed pattern noise data.

Means for Solving the Problems

An infrared imaging device disclosed in this application is characterized by comprising: an infrared imaging element that receives infrared light to capture a thermal image; a temperature sensor that detects a temperature of the infrared imaging element; an FPN memory that stores therein fixed pattern noise data at each of temperatures of the infrared imaging element to be detected; a frame memory that saves a plurality of pieces of frame data composed of thermal images captured by the infrared imaging element in a fixed period of time; and a data generation unit that, when an imaging target is determined not to have changed on a basis of the plurality of pieces of frame data saved in the frame memory, acquires from the FPN memory, the fixed pattern noise data corresponding to the temperature of the infrared imaging element at which said frame data were obtained; and performs averaging processing between average values of the plurality of pieces of frame data and the thus-acquired fixed pattern noise data, to thereby regenerate the fixed pattern noise data in an updated manner.

A method of generating fixed pattern noise data disclosed in this application is characterized by comprising: a step of receiving infrared light to capture thermal images by using an infrared imaging element; a step of saving in a frame memory, a plurality of pieces of frame data composed of thermal images captured by the infrared imaging element in a fixed period of time; a step of determining whether or not an imaging target has changed, on a basis the plurality of pieces of frame data saved in the frame memory; and a step of, when the imaging target is determined not to have changed, acquiring from an FPN memory, fixed pattern noise data corresponding to a temperature of the infrared imaging element at which said frame data were obtained, and then performing averaging processing between average values of the plurality of pieces of frame data and the thus-acquired fixed pattern noise data, to thereby regenerate the fixed pattern noise data in an updated manner.

Effect of the Invention

According to this application, it becomes possible to provide an inexpensive infrared imaging device with a simple structure, for customer use.

MODES FOR CARRYING OUT THE INVENTION

Embodiment 1

An infrared imaging device according to Embodiment 1 of this application will be described. Note that, in the figures, such parts to which the same reference numeral is assigned are the same or equivalent parts, and this commonly applies to the entire text of the description. Hereinafter, Embodiments according to this application will be described with reference to the drawings.

Figure 1:
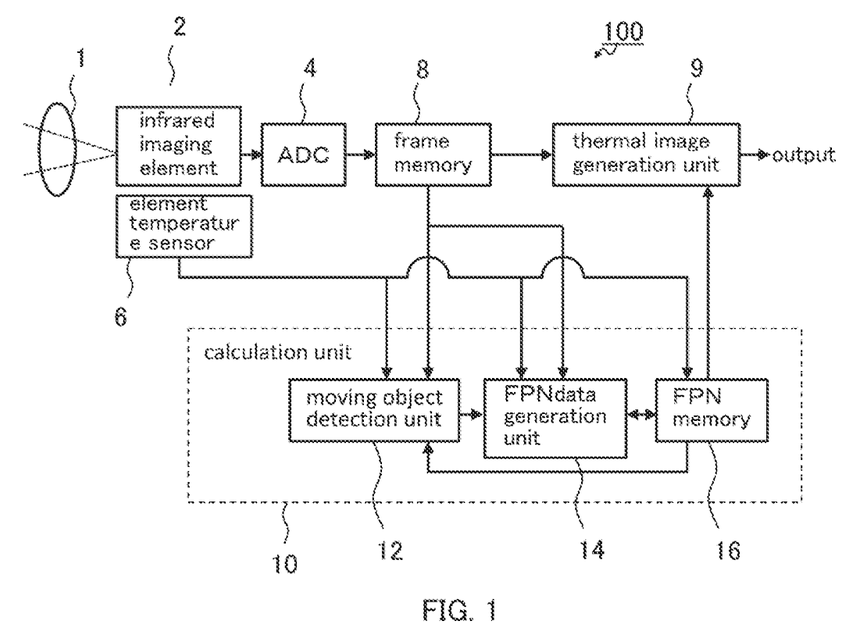
FIG. 1 is a block diagram showing a configuration of an infrared imaging device according to Embodiment 1.

FIG. 1 is a block diagram showing a configuration of an infrared imaging device 100 according to Embodiment 1. As shown in FIG. 1, the infrared imaging device 100 has an optical system 1, an infrared imaging element 2, an ADC (Analog to Digital Convertor, or A/D Convertor) 4, an element temperature sensor 6, a frame memory 8, a thermal image generation unit 9 and a calculation unit 10. The infrared imaging device 100 may be a single completed product, or may be a module used in a state incorporated in another product.

The optical system 1 is an imaging optical system including one or more lenses.

The infrared imaging element 2 is a semiconductor element having a plurality of pixels arranged in a two-dimensional array and capable of capturing a two-dimensional thermal image (infrared image). The pixels are each a temperature sensor having a heat-insulated structure and composed of an SOI diode. The pixel receives through the optical system 1, infrared light emitted from an object (imaging object), and outputs a voltage signal corresponding to the intensity of the received infrared light by use of a phenomenon that the temperature of the pixel varies due to incident infrared light. The voltage signal is outputted as an analog voltage signal. The infrared imaging element 2 creates a two-dimensional thermal image on the basis of the voltage signals of the respective pixels. Image capturing is performed every fixed interval of time, and a frequency of image capturing per one second is represented by a frame rate FPS [Hz].

The ADC 4 converts the analog voltage signals outputted from the infrared imaging element 2 into digital signals and then outputs them.

The frame memory 8 is a memory that records the digital signals outputted from the ADC 4. The data recorded in the frame memory 8 is data of two-dimensionally arranged thermal image corresponding to the intensities of infrared light received by the two-dimensionally arranged pixels of the infrared imaging element 2.

The data that constitutes one two-dimensional image will be referred to as "frame data". All data is handled on a unit frame basis. The frame data is subjected to processing in a First-In First-Out (FIFO) manner in the order of image capturing. The frame memory 8 can retain the thermal images captured at fixed periods of time and corresponding to a plurality of frames. In the following, using a suffix "I" as an integer representative of time, each frame data is represented by D[I] so that the larger the suffix is, the newer the data is. Namely, the data D[1] is the oldest data remaining in the frame memory and, assuming, for example, that "M" and "N" are integers of two or more each representative of image capturing time and satisfying M>N, the data D[M] is data indicative of a frame coming after the data D[N].

The element temperature sense 6 is a temperature sensor that senses the temperature of the infrared imaging device 2. The element temperature sensor 6 is a temperature-sensor IC (Integrated Circuit), a thermistor or the like. It is preferable that the element temperature sensor 6 is located inside the infrared imaging element 2. If the sensor is difficult to be located inside the infrared imaging element 2, it is preferable that it is located as near to the infrared imaging element 2 as possible on a PCB (Printed Circuit Board) on which the infrared imaging element 2 is mounted.

The calculation unit 10 has a moving object detection unit 12, a fixed pattern noise (hereinafter, abbreviated as "FPN") data generation unit 14 and an FPN memory 16. Processing by the moving object detection unit may be performed per each frame, or may be performed per each pixel in each frame.

The moving object detection unit 12 determines whether or not a target imaged by the infrared imaging device 100 has moved. The moving object detection unit calculates each average value $A_F$ and each dispersion $\sigma_F$ with respect to pieces of frame data recorded in a fixed period of time in the frame memory 8. Further, it determines from the thus-calculated dispersion OF, whether or not the imaged target has thermally changed, on the basis of a dispersion $\sigma_{INI}$ and a predetermined constant β. The FPN data generation unit 14 generates FPN data in a later-described manner.

The FPN memory 16 is a memory that stores therein information for correction. In the FPN memory 16, an FPN memory table is stored. The FPN memory table is data in which FPN data and each temperature of the infrared imaging element 2 at which the FPN data was generated, are associated with each other. In the FPN memory 16, constants α, β, the dispersion $\sigma_{INI}$ and a temperature coefficient $T_c$ for correcting the output characteristic related to the temperature, of the infrared imaging element 2, are stored. Note that details of the constants α, β, the dispersion $\sigma_{INI}$, and how to generate the FPN data, will be described later.

The thermal image generation unit 9 performs calculation of subtracting the FPN data saved in the frame memory 16 from the captured image data (frame data) saved in the frame memory 8, to thereby generate a thermal image that results from removal of the FPN data from the frame data, and then outputs the thus-generated thermal image to the outside of the infrared imaging device 100.

Figure 2:
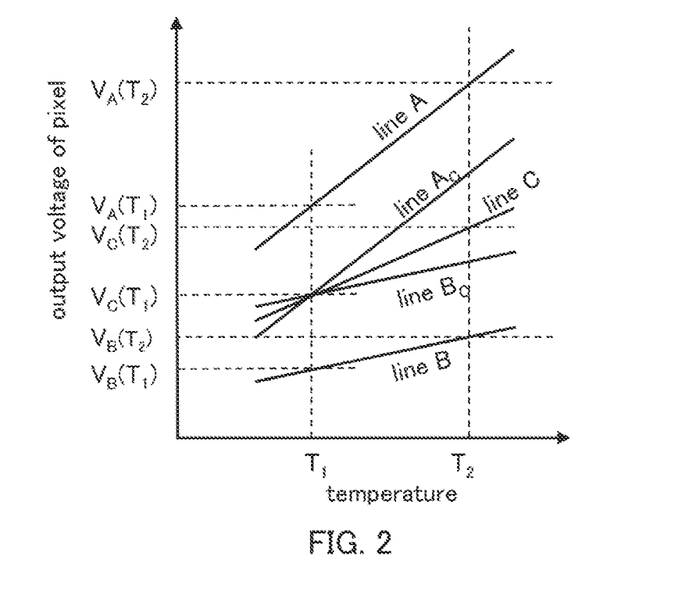
FIG. 2 is a graph for giving an explanation about pixel-to-pixel sensitivity variation and correction thereof in the infrared imaging device according to Embodiment 1.

Next, pixel-to-pixel sensitivity variation in two-dimensionally arranged pixels and correction thereof, will be described using FIG. 2. FIG. 2 is a graph for giving an explanation about the pixel-to-pixel sensitivity variation and the correction thereof in the infrared imaging device 100 according to Embodiment 1. Here, let's assume a certain pixel A and another certain pixel B as representatives of the infrared imaging element 2.

In FIG. 2, a line A represents a relationship between a temperature of the pixel A and an output voltage thereof, and a line B represents a relationship between a temperature of the pixel B and an output voltage thereof. As illustrated here, a variation may occur between the output voltages of the respective pixels even if the temperatures of these pixels are the same. Namely, the variation occurs even if they image objects having the same temperatures. Such a variation is referred to as a sensitivity variation. In the following, operations of setting data for correcting an image with the sensitivity variation and then correcting that image, are referred to as "sensitivity calibration", and the data for correcting the image is referred to as the FPN data.

According to the sensitivity calibration, an output value after the sensitivity calibration has been corrected to an estimation value of the output voltage corresponding to the case where the variation would have not occurred. For example, the estimation value may be set to an average output value of all pixels.

Here, it is assumed that, when an imaging object having an already-known temperature $T_1$ is imaged at a certain element temperature TD, the output voltage of the pixel A is $V_A(T_1)$ and the output voltage of the pixel B is $V_B(T_1)$. Likewise, it is assumed that, when an imaging object having an already-known temperature $T_2$ is imaged, the output voltage of the pixel A is $V_A(T_2)$ and the output voltage of the pixel B is $V_B(T_2)$. It is assumed that an average value of $V_A(T_1)$ and $V_B(T_1)$ is $V_c(T_1)$ and an average value of $V_A(T_2)$ and $V_B(T_2)$ is $V_c(T_2)$. Accordingly, the correction value for the pixel A is "$V_A(T_1)-V_c(T_1)$" and the correction value for the pixel B is "$V_B(T_1)-V_c(T_1)$".

The temperature characteristic of the pixel A, namely, the line A, is corrected by subtraction of the correction value "$V_A(T_1)-V_c(T_1)$", to a line $A_c$. The temperature characteristic of the pixel B, namely, the line B, is corrected by subtraction of the correction value "$V_B(T_1)-V_c(T_1)$", to a line $B_c$. Since the temperature-related output characteristics of the pixel A and the pixel B as they are, differ from a temperature-related output characteristic indicated by average values of line C, the temperature coefficient $T_c$ for correcting the inclination has been derived from the acquired data and stored in the FPN memory 16. A set of correction values for all pixels is the FPN data. The temperature coefficient $T_c$ is calculated by a formula (1).

$$T_c = \{V_c(T_2) - V_c(T_1)\}/(T_2 - T_1) \quad (1)$$

In the frame data, noise components composed of a thermal noise, a shot noise, a quantization noise, etc. are included, so that the output of the infrared imaging element 2 will not be constant when imaging an imaging object even if its temperature does not change with the lapse of time. In order to reduce the influence of these noises, as the above values of $V_A(T_1)$, $V_B(T_1)$, $V_A(T_2)$ and $V_B(T_2)$, average values are used that have been acquired at the time of manufacture in the factory in such a manner that an imaging object whose temperature is already known and whose heat source shows no temperature change (it may be substituted, for example, by a blackbody furnace or a shutter) is imaged over a plurality of frames. Accordingly, the value of the average output voltage obtained per each of the pixels can be converted into temperature information. At the same time, according to this application, "$\sigma_{INI}$" that is a dispersion (σ) of a plurality of pieces of image-captured frame data, has been calculated per each of the pixels and stored in the FPN memory 16 of the infrared imaging device 100. They have been measured and acquired beforehand at the time of manufacture in the factory, prior to the actual use.

Figure 3:
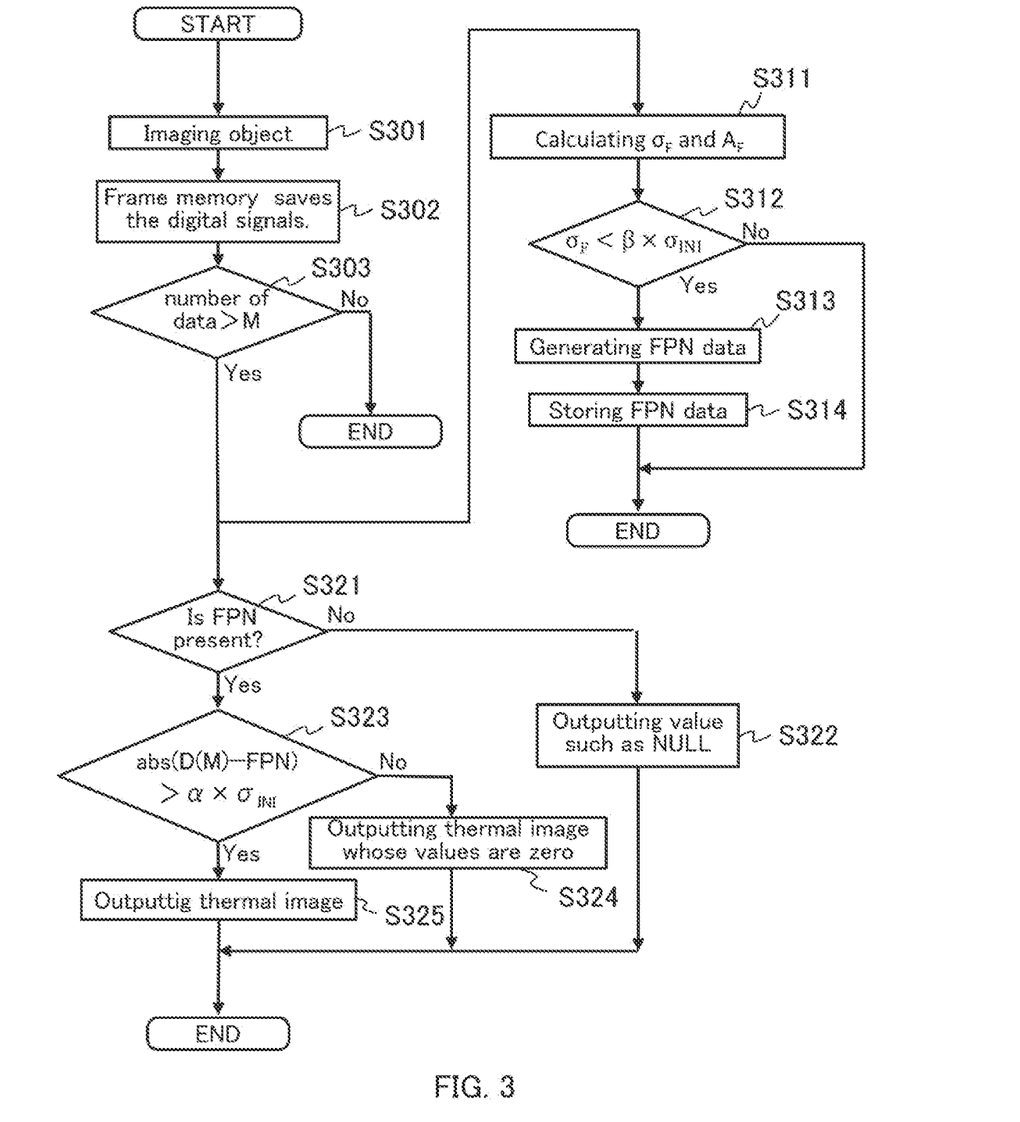
FIG. 3 is a flowchart for illustrating operations by the infrared imaging device according to Embodiment 1.

Next, operations by the infrared imaging device 100 as a whole will be described with reference to FIG. 3. FIG. 3 is a flowchart for illustrating the operations by the infrared imaging device according to Embodiment 1. In the following, it is assumed that "$F_1$", "$F_2$" and "M" are predetermined natural numbers and "$F_1$" and "$F_2$" satisfies $M>F_2>F_1\geq 1$.

First, the infrared imaging element 2 images an object (imaging object) through the optical system 1 (Step S301) such that it receives infrared light emitted from the object to thereby convert the energy of the infrared light into voltage signals. The ADC 4 converts the analog voltage signals outputted from the infrared imaging element 2 into digital signals.

Subsequently, the ADC 4 outputs the digital signals to the frame memory 8, so that the frame memory 8 saves the digital signals outputted from the ADC 4 (Step S302).

Then, the calculation unit 10 determines whether or not the number of pieces of data saved in the frame memory 8 is equal to or more than M (Step S303). If the number of pieces of data saved in the frame memory 8 is equal to or more than M ("Yes" in Step S303), the flow moves to subsequent Steps S311 and S321. If it is less than M ("No" in Step S303), the flow is terminated. Thereafter, upon returning to START, the operation flow is restarted and capturing of the next frame data is executed (the flow returns to Step S301).

Next, description will be made about how to generate FPN data. First, for each of the pixels, the FPN data generation unit 14 calculates the average value $A_F$ and the dispersion Or of frame data $D[F_1]$ to $D[F_2]$ corresponding to a fixed period of time from $F_1$ to $F_2$ saved in the frame memory 8 (Step S311).

Subsequently, the FPN data generation unit 14 determines whether or not the imaging target has changed in the period from $F_1$ to $F_2$ (Step S312). Specifically, for each of the pixels of the infrared imaging element 2, the FPN data generation unit 14 determines whether or not a formula (2) is satisfied (Step S312).

$$\sigma_F < \beta \times \sigma_{INI} \qquad (2)$$

where "β" denotes a predetermined constant.

As mentioned previously, "$\sigma_{INI}$" is an index of noise components in an ideal condition, that is obtained by imaging an imaging target whose temperature is stable (for example, a blackbody furnace, a shutter having an already-known temperature, or the like). Although the imaging target in the frame data $D[F_1]$ to $D[F_2]$ is actually not always ideal, when the dispersion Or obtained by capturing them is lower than the value "$\beta \times \sigma_{INI}$" that is determined using "$\sigma_{INI}$" as a reference, it is at least possible to determine that the imaging target has not moved spatially or it is not a target showing a thermal change. Thus, by performing sensitivity calibration using the average values $A_F$ while regarding them as the FPN data, it becomes possible to detect an imaging target that has spatially or thermally changed.

If not all of the pixels satisfy the formula (2) ("No" in Step S312), the FPN data generation unit 14 determines that the imaging target has changed, and the flow is terminated without regeneration and updating of the FPN data. Thereafter, upon returning to START, the operation flow is restarted and capturing of the next frame data is executed (the flow returns to Step S301).

If all of the pixels satisfy the formula (2) ("Yes" in Step S312), the FPN data generation unit 14 determines that the imaging target has not changed, to thereby generate FPN data (Step S313). When the FPN data corresponding to the temperature of the infrared imaging device 2 at which the average values $A_F$ were generated in Step S311 is present in the FPN memory 16, the FPN data generation unit 14 performs averaging processing between the previous FPN data at said temperature that is present in the FPN memory 16 and the average values $A_F$ generated in Step S311, to thereby update and regenerate the FPN data.

A specific calculation method for averaging employs weighted averaging in which older data is weighted more heavily, as exemplified by a formula (3) in which a ratio of old data $FPN_{OLD}$ to new data $FPN_{NEW}$ is set nearly to 9:1. This makes it possible to decrease the influence of noises which may be not removable by simple averaging of the frame data, to thereby calculate the new data $FPN_{NEW}$ for updating that is as closer as possible to a true value. Accordingly, it is possible to improve the signal-to-noise ratio of the FPN data.

$$FPN_{NEW} = (A_F + 9 \times FPN_{OLD})/10 \qquad (3)$$

When the previous FPN data at said temperature is absent in the FPN memory 16, the FPN data generation unit 14 sets the average values $A_F$ generated in Step S311 as FPN data.

In the case where a user has created the FPN data by imaging a source of heat that is explicitly uniform, since the data can be regarded as highly-reliable FPN data without influence of disturbance, such old data may be weighted at the ratio of 9:1 or more heavily. In contrast, at the time of imaging that which is not a thermal object that is explicitly uniform, such weighting may be changed according to the reliability of the FPN data and, for determining how to perform weighting, the smallness of $\sigma_F$ may be used, for example.

Then, the FPN data generation unit 14 associates the FPN data generated in Step S313 with the temperature of the infrared imaging element 2 that has been acquired from the element temperature sensor 6 at the time of generation of the FPN data, and stores them as the memory table in the FPN memory 16 (Step S314). An interval between the temperatures in the memory table to be stored in the FPN memory 16 is one degree, for example. After the completion of Step S314, the flow is terminated temporarily. Thereafter, upon returning to START, capturing of the next frame data is executed (the flow returns to Step S301).

It is noted that, the flow may be designed so that it moves to Step S313 in the case where the number of pixels that do not satisfy the formula (2) in Step S312 is a predetermined fixed number or less, and so that it is terminated in the other case. Further, although the averaging processing in Step S313 employs weighted averaging using the weight ratio of 9:1, it may use another weight ratio or may employ another averaging method.

Next, description will be made about the sensitivity calibration and the generation of a thermal image. First, using the element temperature sensor 6, the moving object detection unit 12 reads out the current temperature of the infrared imaging element 2, and then determines whether or not an FPN memory table corresponding to the readout temperature is present in the FPN memory 16 (Step S321).

When, for each of the pixels, there is no FPN memory table saved in the FPN memory 16 ("No" in Step S321), the thermal image generation unit 9 outputs a value indicating that no thermal image is generated, for example, it outputs a value such as NULL, other than that for a thermal image (Step S322). Instead, it may just not output any thermal image.

When, for each of the pixels, there is FPN memory table saved in the FPN memory 16 ("Yes" in Step S321), the moving object detection unit 12 determines whether or not a condition 1 represented by a formula (4) is satisfied for each of the pixels (Step S323).

$$\mathrm{abs}(D[M] - FPN) > \alpha \times \sigma_{INI} \qquad (4)$$

Here, "α" denotes a predetermined constant satisfying α>0, "D[M]" denotes the latest frame data or a frame data from which a thermal image is going to be outputted. "abs" denotes execution of an absolute value calculation. By use of the condition 1, it is possible to determine whether or not the frame data D[M] has a variation exceeding a variation due to noise components composed of a thermal noise, a shot noise, a quantization noise, etc., that has been acquired and stored beforehand.

If not all of the pixels satisfy the formula (4) ("No" in Step S323), the thermal image generation unit 9 determines that the imaging target has not changed or that it is not possible to ascertain that the target has changed, and then outputs a thermal image whose values are zero indicating that the thermal image data shows no temperature change (Step S324). Instead, such signals may be outputted that have values other than zero but indicate no such change.

If all of the pixels satisfy the formula (4) ("Yes" in Step S323), the thermal image generation unit 9 determines that the imaging target has changed, and then performs the sensitivity calibration on the frame data D[M] stored in the frame memory 8 by using the FPN data and the temperature coefficient $T_c$ saved in the FPN memory 16, to thereby output a thermal image to the outside (Step S325).

Namely, the infrared imaging device 100 compares the dispersion acquired under actual operations with the dispersion of noises acquired beforehand in the factory, and then, based on the thus-compared result (for example, when they have values at a ratio equal to or less than a specified ratio), regards the time-averaged data about the image-captured frames as FPN data, to thereby make a correction by subtracting this FPN data from the captured thermal image.

In this manner, even though the infrared imaging device 100 uses SOI diodes, the infrared imaging device achieves an effect that it can acquire FPN data without the need of the mechanical shutter and can detect a moving object. Further, since the FPN data that may serve as a temperature reference is once retained before shipment from the factory and FPN-data updating is applied to such reference data, it becomes possible to perform temperature measurement highly accurately without using the mechanical shutter.

After the completion of any one of Step S322, Step S324 and Step S325, the flow is terminated. Thereafter, upon returning to START, the operation flow is restarted and capturing of the next frame data is executed (the flow returns to Step S301).

It is noted that, the flow may be designed so that it moves to Step S325 in the case where the number of pixels that do not satisfy the condition 1 in Step S323 is a predetermined fixed number or less, and so that it is terminated in the other case. Further, in each of Step S312, Step S321 and Step S323, whether or not all of the pixels satisfy a judgement condition is used as a criterion for operation; however, in each of these Steps, whether or not a fixed number of pixels or more satisfy the judgement condition may be used as a criterion for operation.

As described above, the infrared imaging device 100 according to Embodiment 1 comprises: the infrared imaging element 2 that receives infrared light to capture a thermal image; the element temperature sensor 6 that detects a temperature of the infrared imaging element 2; the FPN memory 16 that stores therein FPN data at each of temperatures of the infrared imaging element 2 to be detected; the frame memory 8 that saves a plurality of pieces of frame data $D[F_1]$ to $D[F_2]$ composed of thermal images captured by the infrared imaging element 2 in a fixed period of time; and the FPN data generation unit 14 that, when the imaging target is determined not to have changed on a basis of the plurality of pieces of frame data $D[F_1]$ to $D[F_2]$ saved in the frame memory 8, acquires from the FPN memory 16, the FPN data corresponding to the temperature of the infrared imaging element 2 at which said frame data $D[F_1]$ to $D[F_2]$ were obtained; and performs averaging processing between average values $A_F$ of the plurality of pieces of frame data $D[F_1]$ to $D[F_2]$ and the thus-acquired FPN data, to thereby regenerate the FPN data in an updated manner. Thus, such an effect is achieved that this FPN data can be acquired without the need of the mechanical shutter.

Embodiment 2

According to Embodiment 1, in Step S312 of FIG. 3, the pixels of the infrared imaging device 2 are each subjected to determination about the formula (2) and then, if all of the pixels satisfy that criterion, the flow moves to Step S313, to thereby perform calculation of FPN data. Further, in Step S323, the moving object detection unit 12 determines whether or not the condition 1 represented by the formula (4) is satisfied for all of the pixels, and then, if the condition 1 is so satisfied, the flow moves to Step S325 to thereby perform outputting a thermal image.

By the way, when the background of an image acquired in, for example, moving-object detection for monitoring intrusion or the like of a harmful animal or a suspicious person, is a natural scenery, and when reflection light appears partially in the acquired image and the intensity of the reflection light is fluctuated due to wind, it is assumed that pixels not satisfying the criteria may present at random on the screen. On the other hand, if a real harmful animal is imaged, a change should appear in mutually-adjacent multiple pixels on the screen in a manner depending on the size of the harmful animal.

For that reason, according to Embodiment 2, in Step S312, the pixels of the infrared imaging device 2 are each subjected to determination about the formula (2) and then, if mutually-adjacent pixels the number of which exceeds a predetermined number do not satisfy that condition, with respect the other pixels than the mutually-adjacent pixels the number of which exceeds the predetermined number, the flow moves to Step S313.

Further, according to Embodiment 2, in Step S323, whether or not all of the pixels of the infrared imaging element 2 satisfy the condition 1 represented by the formula (4) is determined and then, if the number of pixels not satisfying the condition 1 is lower than a predetermined number, and the pixels not satisfying the condition 1 are not mutually adjacent, the output of each of the pixels not satisfying the condition 1 is regarded as zero, and the flow moves to Step S325.

The configuration of the infrared imaging device 100 according to Embodiment 2 and the other operations thereof are similar to those of the infrared imaging device 100 of Embodiment 1, so that the same reference numerals are assigned to the corresponding parts and description thereof will be omitted.

Accordingly, it becomes possible to generate FPN data even if there is a disturbance in the captured image. Further, even if there is a disturbance in the captured image, such an effect is achieved that a harmful animal, a suspicious person, etc. intended to be detected can be captured sharply.

It is noted that, in the above Embodiments, "$\sigma_{INI}$" that is the dispersion ($\sigma$) of the plurality of pieces of frame data, may not have been measured and acquired at the time of manufacture in the factory per each infrared imaging device 100, and such a threshold value may instead be used that is matched with the structure, the product model name, the production method, etc. of the infrared imaging device 100 and that was obtained beforehand through experiment, actual measurement, calculation, etc. This makes it possible to eliminate a relatively costly step of acquiring the dispersion at the time of manufacture, so that it becomes possible to provide an infrared imaging device more inexpensively.

Further, although the infrared imaging device 100 is configured to have the frame memory 8, the thermal image generation unit 9 and the calculation unit 10, the components of the infrared imaging device 100 other than the optical system 1, the infrared imaging element 2 and the element temperature sensor 6, for example, may be configured in a separated manner so that signal processing that is herein designed to be performed by the ADC 4, the frame memory 8, the thermal image generation unit 9 and the calculation unit 10 is processed by an external computer.

Figure 4:
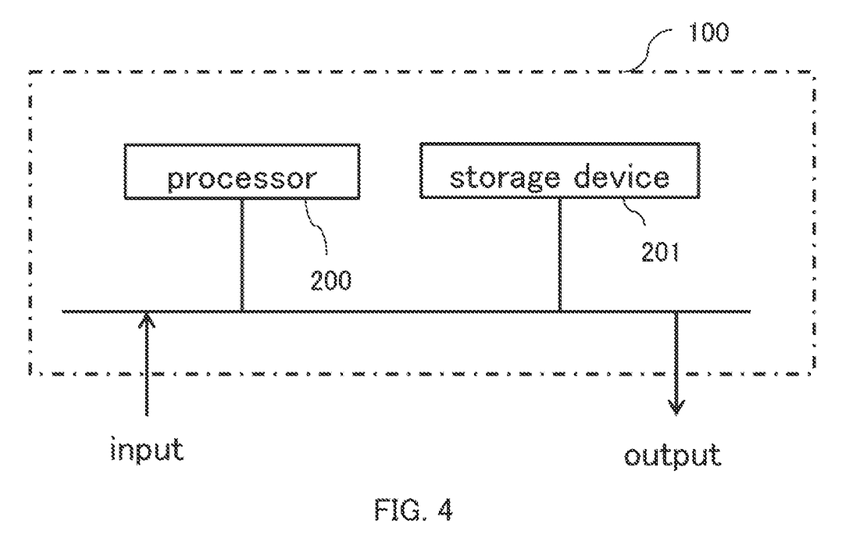
FIG. 4 is diagram showing an example of hardware for the infrared imaging device according to Embodiment 1.

It is noted that, as represented by a hardware example shown in FIG. 4, the infrared imaging device 100 is configured with a processor 200 and a storage device 201. Even though not illustrated, the storage device includes a volatile storage device such as a random-access memory or the like, and a non-volatile auxiliary storage device such as a flash memory or the like. Note that, as the auxiliary storage device, a hard disk may be included instead of the flash memory. The processor 200 executes a program inputted from the storage device 201. In this case, the program is inputted from the auxiliary storage device to the processor 200 through the volatile storage device. Further, processer 200 may output data of a calculation result and the like, to the volatile storage device in the storage device 201, or may save the data in the auxiliary storage device through the volatile storage device.

The technical idea according to this application is not limited to being applied to an infrared imaging device using SOI diodes, and may be applied to an infrared imaging device using a pyroelectric sensor, a thermopile or the like.

In this application, a variety of exemplary embodiments and examples are described; however, every characteristic, configuration or function that is described in one or more embodiments, is not limited to being applied to a specific embodiment, and may be applied singularly or in any of various combinations thereof to another embodiment. Accordingly, an infinite number of modified examples that are not exemplified here are supposed within the technical scope disclosed in the present description. For example, such cases shall be included where at least one configuration element is modified; where at least one configuration element is added or omitted; and furthermore, where at least one configuration element is extracted and combined with a configuration element of another embodiment.

DESCRIPTION OF REFERENCE NUMERALS AND SIGNS

2: infrared imaging element, 6: element temperature sensor, 8: frame memory, 14: FPN data generation unit, 16: FPN memory, 100: infrared imaging device.

The invention claimed is:

1. An infrared imaging device, comprising:
   an infrared imaging element configured to receive infrared light to capture a thermal image;
   a temperature sensor configured to detect a temperature of the infrared imaging element;
   a fixed pattern noise (FPN) memory configured to store therein fixed pattern noise data at each of temperatures of the infrared imaging element;
   a frame memory configured to save a plurality of pieces of frame data composed of thermal images captured by the infrared imaging element in a fixed period of time; and
   a data generator that, when an imaging target is determined not to have changed on a basis of the plurality of pieces of frame data saved in the frame memory, is configured to acquire from the FPN memory, the fixed pattern noise data corresponding to the temperature of the infrared imaging element at which said frame data were obtained; and configured to perform averaging processing between average values of the plurality of pieces of frame data and the thus-acquired fixed pattern noise data, to thereby regenerate the fixed pattern noise data in an updated manner.

2. The infrared imaging device of claim 1, wherein the data generator is configured to determine the imaging target not to have changed, when a following formula (2) is satisfied for each of multiple pixels included in the infrared imaging element, $$\sigma F < \beta \times \sigma INI \qquad (2)$$

assuming that "σF" denotes a dispersion of the plurality of pieces of frame data, "σINI" denotes a dispersion index of noise components in an ideal condition at the temperature of the infrared imaging element at which the plurality of pieces of frame data were obtained, and "β" denotes a predetermined constant.

3. The infrared imaging device of claim 1, further comprising a thermal image generation unit configured to generate a thermal image resulting from removing the fixed pattern noise data regenerated in an updated manner, from frame data composed of thermal images captured by the infrared imaging element.

4. The infrared imaging device of claim 3, wherein the data generator is configured to determine the imaging target not to have changed, when a following formula (2) is satisfied for each of multiple pixels included in the infrared imaging element, $$\sigma F < \beta \times \sigma INI \qquad (2)$$

assuming that "σF" denotes a dispersion of the plurality of pieces of frame data, "σINI" denotes a dispersion index of noise components in an ideal condition at the temperature of the infrared imaging element at which the plurality of pieces of frame data were obtained, and "β" denotes a predetermined constant.

5. The infrared imaging device of claim 1, wherein in performing the average processing, the data generator is configured to calculate a weighted average between the average values of the plurality of pieces of frame data and the thus-acquired fixed pattern noise data.

6. The infrared imaging device of claim 5, wherein in calculating the weighted average, the data generator is configured to weigh the thus-acquired fixed pattern noise data more heavily than the average values of the plurality of pieces of frame data.

7. A method of generating fixed pattern noise data, comprising:
   a step of receiving infrared light to capture thermal images by using an infrared imaging element;
   a step of saving in a frame memory, a plurality of pieces of frame data composed of thermal images captured by the infrared imaging element in a fixed period of time;
   a step of determining whether or not an imaging target has changed, on a basis the plurality of pieces of frame data saved in the frame memory; and
   a step of, when the imaging target is determined not to have changed, acquiring from a fixed pattern noise (FPN) memory, fixed pattern noise data corresponding to a temperature of the infrared imaging element at which said frame data were obtained, and then performing averaging processing between average values of the plurality of pieces of frame data and the thus-acquired fixed pattern noise data, to thereby regenerate the fixed pattern noise data in an updated manner.

8. The method of claim 7, wherein performing the averaging processing comprises calculating a weighted average between the average values of the plurality of pieces of frame data and the thus-acquired fixed pattern noise data.

9. The method of claim 8, wherein in calculating the weighted average, the thus-acquired fixed pattern noise data is weighted more heavily than the average values of the plurality of pieces of frame data.

* * * * *